United States Patent
Jujjuri et al.

(10) Patent No.: US 12,360,982 B1
(45) Date of Patent: Jul. 15, 2025

(54) HYBRID DATABASE SYSTEM FOR STRONGLY CONSISTENT AND HIGHLY SCALABLE METADATA STORAGE

(71) Applicant: Salesforce, Inc., San Francisco, CA (US)

(72) Inventors: Venkateswararao Jujjuri, Beaverton, OR (US); Sushanth Rai, San Jose, CA (US); Jayant Kumar, Hyderbad (IN); Anup Ghatage, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/783,368

(22) Filed: Jul. 24, 2024

(51) Int. Cl.
G06F 16/23 (2019.01)
G06F 11/20 (2006.01)
G06F 16/2455 (2019.01)
G06F 16/25 (2019.01)

(52) U.S. Cl.
CPC ........ *G06F 16/2365* (2019.01); *G06F 11/203* (2013.01); *G06F 16/24552* (2019.01); *G06F 16/256* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 10,693,951 B2 | 6/2020 | Jujjuri et al. | |
| 10,713,223 B2 | 7/2020 | Jujuri et al. | |
| 10,853,046 B2 | 12/2020 | Mudumbai et al. | |
| 11,016,990 B2 | 5/2021 | Wyatt et al. | |
| 11,509,721 B2 | 11/2022 | Ghatage et al. | |
| 11,622,000 B2 | 4/2023 | Mehta et al. | |
| 11,734,278 B2 | 8/2023 | Vattem et al. | |
| 2015/0286695 A1* | 10/2015 | Kadayam | G06F 16/27 707/639 |
| 2017/0322994 A1 | 11/2017 | Jujjuri et al. | |
| 2018/0329605 A1 | 11/2018 | Venkateswararao | |
| 2019/0179755 A1 | 6/2019 | Mudumbai et al. | |
| 2023/0147295 A1 | 5/2023 | Guttapalem et al. | |

FOREIGN PATENT DOCUMENTS

| | | |
|---|---|---|
| WO | 2019028130 A1 | 2/2019 |
| WO | 2022165452 A1 | 8/2022 |
| WO | 2022165460 A1 | 8/2022 |

* cited by examiner

*Primary Examiner* — Eddy Cheung
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for managing metadata of a distributed database system in a hybrid manner. A computer system may receive, from a computing device, a request to access a set of data stored in nodes of a distributed storage system that is a caching layer of the system. The system retrieves metadata for a set of data specified in the request, including accessing a reversemap storing a reverse-ordered copy of original metadata stored in a metadata store of the system, where the reversemap is stored on durable storage of the system. Based on retrieving the metadata from the reversemap, the system accesses nodes of the distributed storage system, where the reversemap specifies the nodes of the distributed storage system that store the set of data. The system transmits, to the computing device, information indicating a result of accessing data stored in nodes of the distributed storage system.

20 Claims, 7 Drawing Sheets

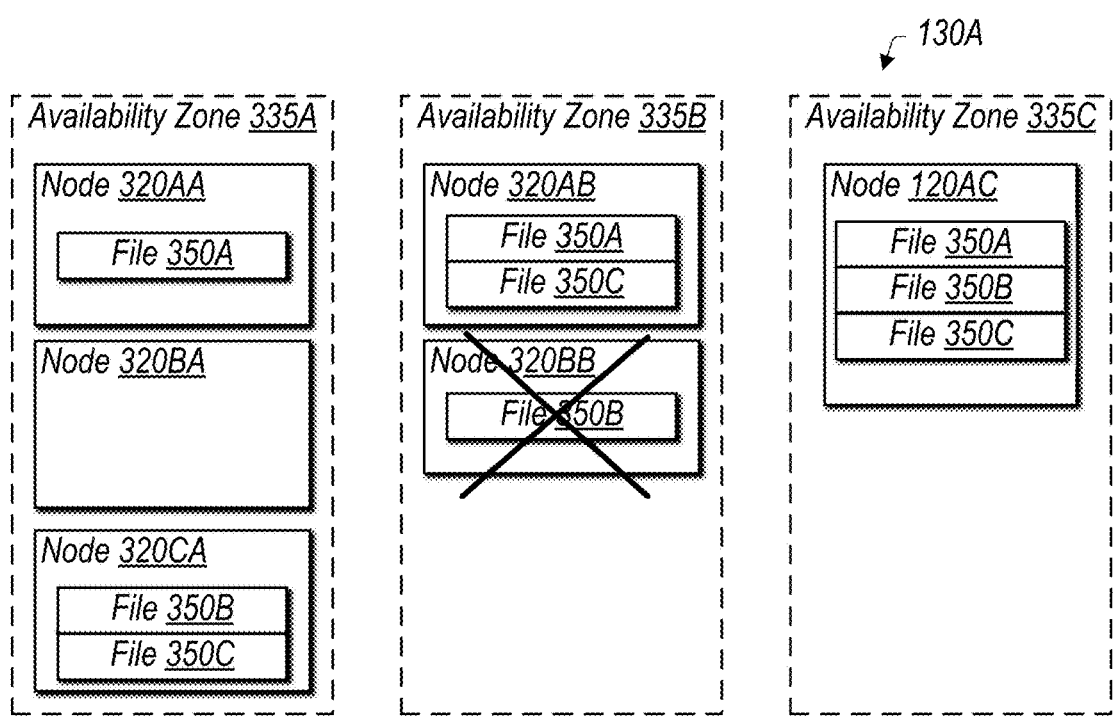
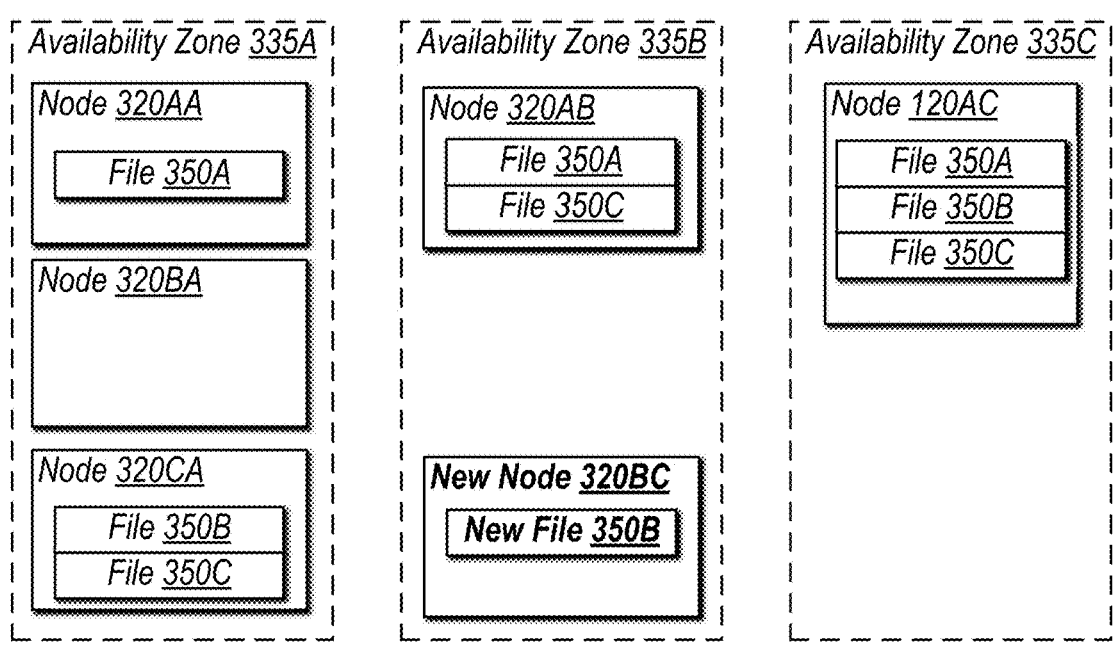
Distributed Storage System
(With New Node)
FIG. 3

Method
500

Receive, from a computing device, a request to access a set of data stored in one or more nodes of a distributed storage system that is a caching layer of the computer system.
510

Retrieve, by the computer system, metadata for a set of data specified in the request, wherein retrieving the metadata includes accessing a reversemap storing a reverse-ordered copy of original metadata stored in a metadata store of the computer system, and wherein the reversemap is stored on durable storage of the computer system.
520

Access, based on retrieving the metadata for the set of data from the reversemap, one or more nodes of the distributed storage system for the request, wherein the accessing is performed based on the reversemap specifying the one or more nodes of the distributed storage system that store the set of data.
530

Transmit, to the computing device, information indicating a result of accessing the one or more nodes of the distributed storage system based on the metadata specified in the reversemap.
540

*FIG. 5*

HYBRID DATABASE SYSTEM FOR STRONGLY CONSISTENT AND HIGHLY SCALABLE METADATA STORAGE

BACKGROUND

Technical Field

This disclosure generally relates to database systems and, more specifically, to various mechanisms for implementing a strongly consistent, highly scalable metadata store.

Description of the Related Art

Databases are a common method for organizing stored data in computer systems. Many databases are distributed databases which store data across multiple different storage nodes, often in various locations, for example, on different servers that may be located in different geographic locations. End users may request to retrieve various records from a database. Such requests may be for various database operations, including retrieval of a database record, storage of a new record, or removal of a previously stored record from the database. Managing metadata of a distributed database, particularly one that has multiple storage nodes located in multiple different geographic locations (e.g., different data centers), such as a key-value store, is quite complicated. For example, metadata management for a distributed database may lead to various data management problems, including storage capacity, data retrieval speed, scalability, and cost, which may include both computational and financial costs. Often, the requirements of metadata maintenance are different than the requirements of regular data storage (i.e., the data that the metadata describes). As such, metadata storage may be implemented differently than storage of its corresponding data. For example, while the storage of data may require both consistency and scalability, metadata storage may only require consistency or scalability, or may only need to meet one of these requirements. In addition, certain metadata operations (e.g., reading or writing metadata) may be either latency sensitive or throughput sensitive in addition to requiring consistency. Requirements for management of metadata become especially important during certain database scenarios, such as: reading or writing large amounts of data at a given time, decommissioning existing database nodes, scaling data stored in a database up or down, detecting failure of a database node, etc.

BRIEF DESCRIPTION OF THE DRAWINGS

FIG. 3 is a block diagram illustrating example elements of a distributed storage system during a node crash, according to some embodiments.

FIG. 5 is a flow diagram illustrating an example method relating to managing metadata for a distributed database system using a reversemap stored on durable storage, according to some embodiments.

DETAILED DESCRIPTION

Figure 1:
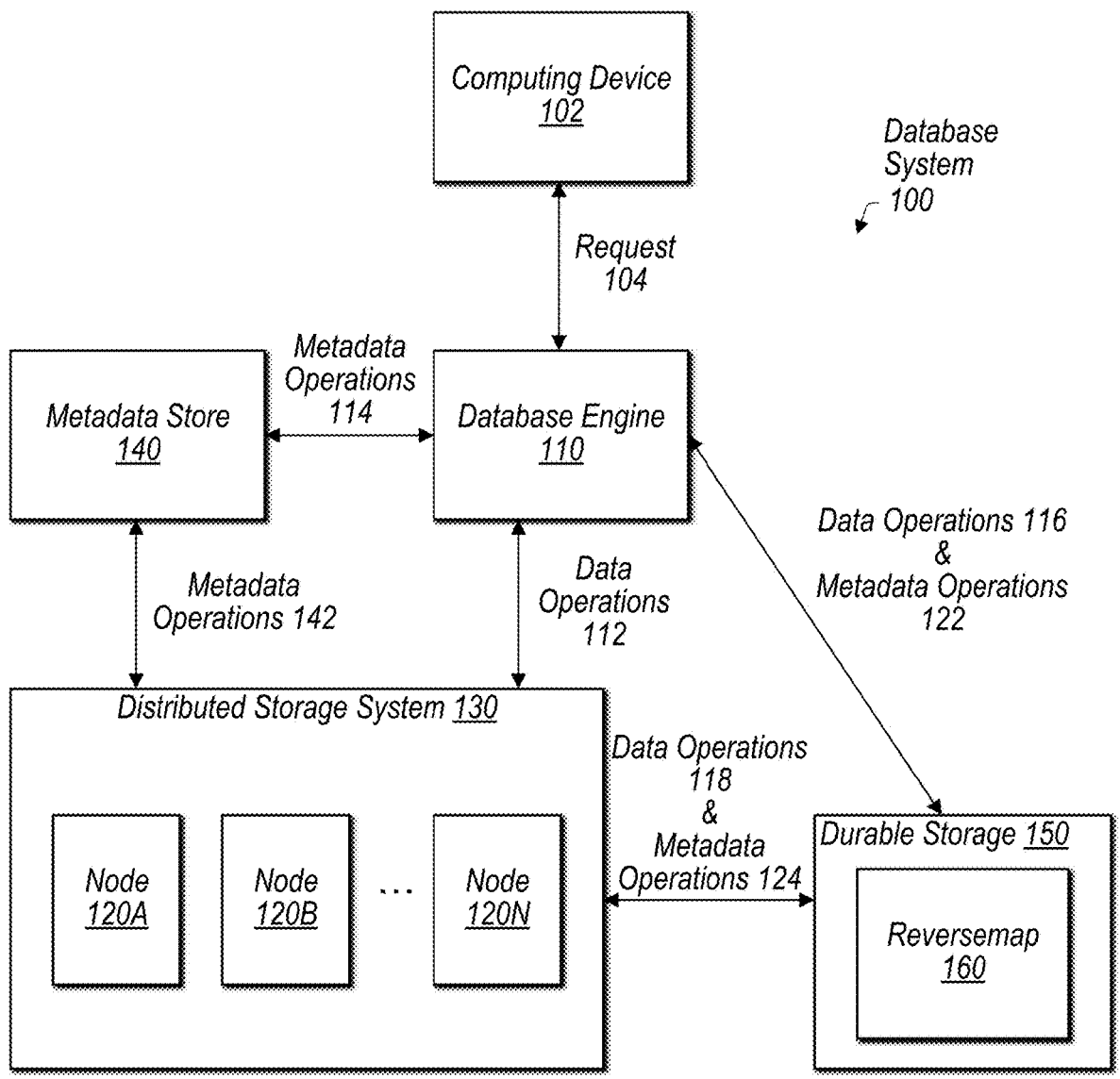
FIG. 1 is a block diagram illustrating example elements of a distributed database system, according to some embodiments.

Database systems rely on database storage to manage and retrieve structured information, from a database, for example. This data is often managed to support tasks such as data processing, user authentication, content delivery, data analytics, and real-time information access. In many cases, data in the context of database storage is stored in the form of database extents (also referred to herein as "ledgers" or "files"). For example, a given set of data that a user wishes to access might be stored by a database system in one or more files. In this example, a first subset of the set of data might be stored in a first file, while a second subset of the set of data might be stored in a second, different file of the database system.

Frequently, a database engine (also referred to herein as a "database server") of a database system manages and accesses files by storing them in durable storage (also referred to herein as a "scalable object store"). Durable storage, as used herein, refers to a storage system that is intended for the long-term storage of data, particularly one that can survive power outages and catastrophic events (e.g., AMAZON S3™ within AMAZON WEB SERVICES (AWS) and datacenters are examples of durable storage). This storage is the "source of truth" for data stored by a distributed storage system of the database system which acts as a caching layer of the database system. Storage of data extents in durable storage provides for long-term storage in a highly durable and scalable manner, but does not offer strict consistency and, as a result, does not always satisfy performance requirements e.g., specified in service-level agreements regarding data retrieval.

To provide stricter consistency and better data retrieval performance times, the disclosed system also stores extents in the distributed storage system. The distributed storage system acts as a cache layer for the durable by storing copies of data extents across different database nodes in a replicated, durable manner. To manage movement of data between both durable storage within a scalable object store and consistent storage in the distributed storage system, the disclosed database management system implements a metadata store, which stores information describing the data stored in database nodes of the distributed storage system.

In many situations, when receiving a particular query specifying a particular data object, the distributed database system determines the location of the particular data object (e.g., which extent this object is currently stored in) by looking up the object in the metadata store and then accesses the particular data object according to its corresponding metadata. In the durable storage example above, the database system accesses the data extent within the durable storage corresponding to the particular data object. As discussed above, in many cases, when a database system directly accesses extents in durable storage, these operations may have a higher access latency relative to accessing data using other storage services (e.g., data stored in the distributed storage system). This may be caused by hardware limitations of durable storage, which commonly have higher access latencies than other types of storage technology. This increase in latency may cause issues for certain applications, however. As such, the disclosed database system implements a distributed storage system in addition to the durable storage in order to access requested data with lower access latencies.

Managing metadata of a distributed database system is often complicated due to the balancing act nature of the distributed database system. In many situations, at least a portion of the metadata for the distributed database system needs to be strongly consistent. As used herein, the term "strongly consistent" is intended to be construed according to its well-understood meaning, which includes a property of distributed database systems that ensures nodes in a given system store the same data at the same time regardless of which node within the given distributed database system is being accessed at any given time. Systems offering strongly consistent storage of metadata, however, are often not scalable. As used herein, the term "scalable" is intended to be construed according to its well-understood meaning in the context of database systems, which refers to the ability of a database to manage increasing amounts of new data without sacrificing performance or availability of the stored data.

The distributed database system smartly overcomes scalability limitations of strongly consistent systems by offloading non-critical operations without impacting the correctness of the data impacted by those operations. For example, the disclosed system accomplishes hybrid metadata management by generating a reversemap. As used herein, the term "reversemap" refers to a mapping between one or more nodes of a distributed database system and the data that they store. For example, the reversemap provides a reverse lookup capability for the database system. This reverse lookup capability enables the distributed database system to identify, in a quick summary, metadata for various nodes of the system. For example, the information included in the reversemap indicates one or more files stored by the various nodes of the distributed storage system. This reversemap stores portions of the metadata which are not required to be strongly consistent in durable storage instead of the metadata store (which is highly durable and strongly consistent). The reversemap can be accessed to determine, for example, which nodes in the distributed database system have failed and which data those nodes were storing prior to failure.

After accessing the reversemap to determine metadata, the database system stores copies of the lost data (that was previously stored on the failed node) in another, active node or a new node of the distributed database system. This alleviates the need for accessing the metadata store to do a bulk scan of the distributed storage system which is both time- and resource-intensive and often does not satisfy service-level agreements (SLA's) of a client in terms of the timing of retrieving the data. As one example, the reversemap stored on durable storage is stored in a storage node-friendly format, such that the reversemap provides a "reverse" lookup capability. This reverse lookup capability is achieved by storing a mapping between the cache nodes and the data (i.e., files) which they store. An exemplary reversemap is discussed in detail below with reference to FIG. 4.

These techniques may be advantageous over prior approaches as the disclosed techniques allow for both strongly consistent and highly scalable metadata storage without introducing prohibitive cost. For example, in contrast to strongly consistent metadata storage, scalable storage of metadata for a distributed database system is often resource intensive (e.g., both computationally and financially expensive) to maintain. To provide both strong consistency and scalability, the disclosed database system divides up the metadata storage between two systems: one that is non-scalable and strongly consistent and one that is highly scalable and eventually consistent. For example, metadata requiring scalability is managed in a highly scalable but eventually consistent manner while the metadata requiring strong consistency is managed in a strongly consistent and non-scalable manner. This allows the disclosed distributed database system to address the metadata needs of different database management systems without compromising on performance, durability, availability, and cost. In contrast, if the system were to provide both high scalability and strong consistency of the metadata, this would not be cost effective. An exemplary application of these techniques will now be discussed, starting with reference to FIG. 1.

Exemplary Database System

Turning now to FIG. 1, a block diagram of a distributed database system 100 is shown. System 100 is one example of a database management system and includes a set of components that may be implemented via hardware or a combination of hardware and software routines. As one specific example, system 100 is a cloud-based customer relationship management system, such as Salesforce.com, that implements a strongly consistent and highly scalable distributed database system and receives requests from one or more computing devices 102.

In the illustrated embodiment, database system 100 includes database engine 110, metadata store 140, durable storage 150, and distributed storage system 130, which in turn includes a plurality of availability zones 135A-135N. Database system 100 implements distributed storage system 130 as a persistent cache system that pulls data from durable storage 150. In this way, distributed storage system 130 provides data more quickly to the database engine 110 than if database engine 110 were to access the durable storage 150 for the same data. As one example, metadata store 140 may be executed using Apache Zookeeper™ and distributed storage system 130 may be executed using Apache BookKeeper™. In contrast, durable storage 150 is a scalable object store that may be executed using Amazon S3 or Google Cloud Storage™.

In various embodiments, the durable storage 150 is a scalable object store which provides durability, scalability, and throughput. Further, durable storage 150 provides a source of truth for all data stored and managed by distributed database system 100. Durable storage 150, however, does not offer strong consistency or low latency performance in terms of data retrieval. To provide both durability and low latency, distributed database system 100 implements distributed storage system 130, which is a distributed cache system with a plurality of storage nodes. The nodes 120A-120N of distributed storage system 130 have the responsibility to cache data (e.g., files) from durable storage 150 and provide this data to computing devices such as computing device 102, via database engine 110, at lower latencies than durable storage 150.

In addition, database system 100 manages metadata store 140 which stores metadata for distributed storage system 130 in a highly durable and strongly consistent manner. Metadata store 140 stores metadata for data (e.g., files) that is pulled from durable storage 150 and cached within distributed storage system 130. When a new node 120 is initiated in distributed storage system 130, this storage node registers itself with the metadata store 140 by storing details about itself and the data that it stores (this data may be referred to as ledger metadata) in the metadata store 140. For a node to exist in system 130, it must first register itself with metadata store 140. An instance of metadata stored in metadata store 140 for a given node may be referred to as a "cookie."

In various embodiments, disturbed storage system 130 serves as a first point of contact for clients attempting to read data from and write data to database system 100. To provide high availability of this data that clients are attempting to access, database system 100 replicates the data across multiple nodes 120A-120N of distributed storage system 130. The copies of a given ledger may be referred to herein as an "ensemble of the ledger." Accordingly, distributed storage system 130 is able to interact with metadata store 140 in various scenarios to provide access for clients to data stored and maintained by database system 100. For example, when a client requests to read a set of data, distributed storage system 130 looks up the metadata for this set of data in metadata store to locate the nodes of system 130 within which the set of data is currently cached, the size of the set of data, etc.

In some situations, distributed storage system 130 decommissions one or more existing nodes 120A-120N. For example, in some situations, system 130 is scaled down in terms of the number of nodes being maintained within the system. In these situations, however, because data stored in the nodes being decommissioned needs to always be available, system 130 relocates this data to one or more other nodes 120 that are not being decommissioned. Decommissioning of a node (e.g., when this node fails) requires distributed storage system 130 to understand from metadata store 140 which files reside on the node to be decommissioned. In this way, distributed storage system 130 is able to quickly recover the data that was lost when the node failed. Previously, when decommissioning a node, system 130 would read the entirety of metadata for all files from the metadata store to check if the ensemble in the metadata store for each ledger indicates whether each file is stored on the node to be decommissioned. As the number of nodes 120, and consequently the amount of metadata grows, this scan is not scalable. To address this scalability issue, in disclosed techniques, distributed storage system 130 accesses durable storage 150 instead of metadata store 140 to locate the node being decommissioned via the reversemap 160 in order to quickly determine which files are stored by the node being decommissioned.

In contrast to the node decommissioning scenario in which distributed database system 130 needs to work with all files it stores, when working with an individual file or a small subset of the files, the operations performed by system 130 are latency sensitive. For example, when reading or writing one or more files to nodes of distributed storage system 130, system 130 needs metadata for a single (or a few) files so that database engine 110 knows which node 120 to read data from or write data to. As discussed above, such operations are latency sensitive and need the metadata to be strongly consistent and highly available. Thus, when handling individual files, distributed database system 130 accesses metadata store 140 to obtain metadata, since the metadata store 140 provides low latency operations and strongly consistent metadata.

In contrast and as discussed above, when working with many files stored by database system 100, distributed storage system 130 accesses durable storage 150 to obtain the large amount of metadata stored for the files. For example, when performing database operations other than reading and writing operations, system 130 needs to know the entire list of files which normally results in system 130 reading the metadata for every file stored in the metadata store. In disclosed techniques, however, system 130 accesses the reversemap 160 stored in durable storage 150 instead. Such operations do not require the metadata for the files to be strongly consistent, since the list operation output by the reversemap may be stale by the time it is read. This is not problematic, since new files can be created and written to distributed storage system 130 when a listing operation is underway. While listing operations do not require strong consistency, they are throughput sensitive (e.g., the large amount of metadata being moved during the listing operation) and need to scale as the number of files stored in the system grows.

While previously metadata store 140 served metadata for both of the scenarios discussed above (e.g., for both single file and bulk file operations), this implementation is not scalable as the amount of metadata stored by database system 100 grows. Thus, disclosed techniques introduce a hybrid metadata storage architecture that combines the storage of metadata in both the low latency, strongly consistent, and highly available metadata store 140 and the high latency, eventually consistent durable storage 150 (via reversemap 160). Disclosed techniques accomplish this hybrid metadata storage by storing portions of the metadata which are not required to be strongly consistent on durable storage 150.

Database engine 110, in the illustrated embodiment, receives a request 104 from a computing device 102 to access a set of data stored by database system 100. In various embodiments, database engine 110 receives a plurality of requests 104 from various computing devices 102. For example, database engine 110 receives a read request from a first computing device 102 and a write request from a second, computing device. In some embodiments, a single request 104 specifies multiple different types of database operations to perform. For example, a request submitted to database engine may include both a read request to read a first set of data and a write request to write a second, different set of data to database system 100. In still other embodiments, request 104 includes a request to update or delete a set of data from database system 100. The set of data specified in request 104 may include a request to access one or more records or files (a file may be made up of multiple database records) stored by database system 100.

In response to request 104, database engine 110 accesses either metadata store 140 or durable storage 150 to retrieve metadata for servicing request 104. For example, if request 104 is to read from or write to one or more files stored in distributed storage system 130, then database engine 110 accesses metadata store 140 to retrieve metadata for the one or more requested files via a low latency, strongly consistent search of metadata store 140. If, however, request 104 is to delete a set of files or to access files stored on a failed node (which would result in database engine 110 decommissioning this node and storing its files in another, non-failed node), then database engine 110 accesses durable storage 150 to obtain reversemap 160 via a higher latency, eventually consistent search of reversemap 160. In this example scenario, database engine 110 uses reversemap 160 to determine the mapping between the nodes and files of distributed storage system 130.

When accessing metadata store 140, database engine 110 performs metadata operations 114 to determine which nodes 120 of distributed storage system 130 store one or more files specified in request 104. After identifying the corresponding node(s) 120 from metadata store 140, database engine 110 performs one or more data operations 112 to read the requested files from or write the requested files to the identified node(s). Database engine 110, in turn, transmits the data or information indicating successful writes to computing device 102. For example, database engine 110 performs one or more create, read, update, and delete (CRUD) operations on the set of data specified in request 104. Update database operations may also be referred to herein as "write" operations.

When accessing durable storage 150, database engine 110 performs metadata operations 122 to retrieve information from reversemap 160 to determine mappings between nodes and files for distributed storage system 130. These mappings assist database engine 110 (via distributed storage system 130) in performing data operations 112 to decommission one of nodes 120A-120N. Further, the mappings specified in reversemap 160 assist database engine in writing copies of the files previously stored in the decommissioned node to one or more other nodes of system 130. In some embodiments, prior to accessing durable storage 150 for a request, database engine 110 first attempts to access a node in system 130. This access may be for a read operation, write operation, delete operation, etc. In response to the access failing, system 130 identifies that this node has failed (and, therefore, requires decommissioning). In such embodiments, based on identifying the failed node, database engine 110 accesses durable storage 150 to determine mappings between nodes and files of system 130 via reversemap 160 in order to decommission the failed node.

When generating reversemap 160, database engine 110 causes metadata operations 124 to be performed between distributed storage system 130 and durable storage 150. For example, prior to receiving request 104, database system 100, via distributed storage system 130, generates the reversemap by determining, for nodes 120A-120N, one or more files stored on the nodes. In this example, distributed storage system 130 then stores reversemap on durable storage 150. In various embodiments, database engine 110 determines file locations by accessing metadata stored in metadata store 140 that indicates, via key-value pairs, filenames and a list of corresponding nodes on which that file exists (i.e., the nodes in which the file corresponding to the filename is stored). As database system 100 spins up new nodes within distributed storage system 130, these nodes register themselves with metadata store 140 by storing details about themselves and details about the data that they store (e.g., which files the new node currently stores) in metadata store 140. Over time, the new nodes send updated information (i.e., metadata) about themselves to the metadata store 140 via metadata operations 142 to ensure that metadata store 140 includes the most up-to-date information. Based on the information stored in metadata store 140, database engine 110 generates a map indicating, for each file stored in distributed storage system 130, a list of nodes on which this file is stored. In this way, database engine 110 generates a summary of the nodes 120A-120N of distributed storage system 130 at that given time. Database engine 110 then causes, via metadata operations 124, durable storage 150 to store the reversemap.

When request 104 includes a request to write a set of data to a database of system 100, database engine 110 writes the set of data to two places: the distributed storage system 130 (e.g., via data operations 112) and the durable storage 150 (e.g., via data operations 116). In contrast, when request 104 includes a request to read data from a database of database system 110, database engine 110 retrieves the requested data from distributed storage system 130. Read requests, particularly single access operations, are often latency dependent and, thus, must be completed within one or two milliseconds in order to meet e.g., a service level agreement (SLA). Accordingly, database engine 110 accesses distributed storage system 130 rather than durable storage 150 for read requests. To further improve data access times as discussed above, for other types of requests (e.g., ones that involve reading metadata for many nodes of system 130), database engine 110 first accesses a reversemap 160 to look up locations of data specified in these other types of requests (rather than having to look through every node listed in metadata store 140) to determine which nodes are currently storing the requested data.

As discussed above, in situations of node failure, database system 100 causes a copy of data that was previously stored on a failed node to be retrieved from durable storage 150 and stored in distributed database system 130 (e.g., in a different node than the failed node). This data retrieval for a failed node is represented by data operations 118. Node failure scenarios for distributed database system 100 are discussed in further detail below with reference to FIG. 3.

As used herein, the term "engine" is intended to be construed according to its well-understood meaning, which includes a set of program instructions executable to perform one or more operations. For example, database engine 110 shown in FIG. 1 includes a set of program instructions executable to manage and maintain metadata store 140, distributed storage system 130, and durable storage 150, while servicing queries from one or more computing devices, such as computing device 102. As such, an engine is either software or hardware that is operable to perform a specified set of operations. An engine may refer to a set of software instructions that are executable by a computer system to perform the set of operations. An engine may also refer to hardware that is configured to perform the set of operations. A hardware engine may constitute general-purpose hardware as well as a non-transitory computer-readable medium that stores program instructions, or specialized hardware such as a customized ASIC. Accordingly, an engine that is described as being "executable" to perform operations refers to a software engine, while an engine that is described as being "configured" to perform operations refers to a hardware engine. An engine that is described as "operable" to perform operations refers to a software module, a hardware engine, or some combination thereof. Further, for any discussion herein that refers to an engine that is "executable" to perform certain operations, it is to be understood that those operations may be implemented, in other embodiments, by a hardware engine "configured" to perform the operations, and vice versa."

Figure 2:
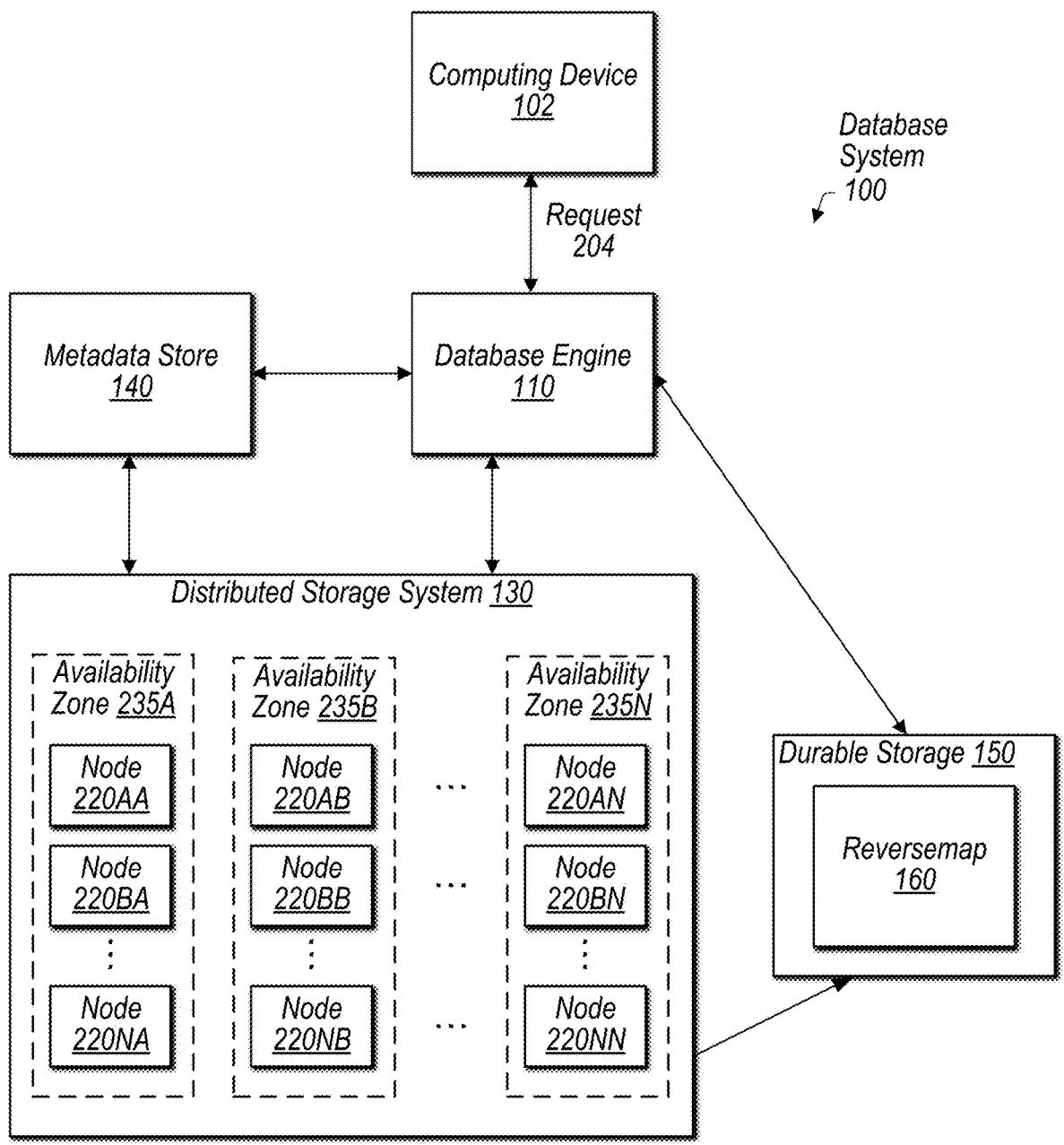
FIG. 2 is a block diagram illustrating additional example elements of the distributed database system of FIG. 1, according to some embodiments.

Turning now to FIG. 2, a block diagram illustrating additional example elements of the distributed database system 130 of FIG. 1 is shown. In the illustrated embodiment, distributed storage system 130 of database system 100 includes a plurality of availability zones 235A-235N. These availability zones each include a plurality of nodes. For example, availability zone 235A includes nodes 220AA-220NA, availability zone 235B includes nodes 220AB-220NB, while availability zone 235N includes nodes 220AN-220NN. As used herein, the term "availability zone" is intended to be construed according to its well-understood meaning, which includes separate locations, often geographically, of data storage such that failures in one availability zone do not impact data stored in another availability zone. Implementation of multiple availability zones is advantageous in that, if first availability zone goes down (e.g., due to a natural disaster such as a fire), then a copy of the same data that was stored in the first availability zone is accessible at another availability zones. For example, the different availability zones 235A-235N often store copies of data stored on the other nodes. As discussed in further detail below with reference to FIG. 4, this data duplication is mapped in the metadata stored for the different nodes. For example, reversemap 160 stores mappings between the nodes of availability zones 235A-235N and the files that each node stores. In this example, multiple copies of a given file will be stored at multiple different nodes, often located within different ones of availability zones 235A-235N.

In some situations, one availability zone 235A is a first data center located in Nevada, while another availability zone 235B is a second, different data center located in New York. In this way, not only does distributed storage system 130 provide a lower latency option for clients accessing data stored by database system 100, but the data duplication provided by the multi-availability zone implementation also ensures that the data is always available to clients regardless of failures at one availability zone.

Turning now to FIG. 3, a block diagram illustrating example elements of a distributed storage system during a node crash is shown. In the illustrated embodiment, an example of distributed storage system 130A that includes a crashed node is shown in the top portion of the figure, while an example of the same distributed storage system 130B, but after it has been repaired, is shown in the bottom portion of the figure.

Example distributed storage system 130A, in the illustrated embodiment, includes three different availability zones 335A, 335B, and 335C, which in turn include different numbers of nodes 320. In the illustrated embodiment, availability zone 335A includes node 320AA, node 320BA, and node 320CA. Node 320AA, located in availability zone 335A, stores a copy of a single file 350A, node 320BA does not store any files (this node is currently empty), and node 320CA stores copies of two different files 350B and 350C. Similarly, node 320AB, located in availability zone 335B, stores a copy of two different files 350A and 350C, while the failed node 320BB stores a copy of file 350B. Node 120AC, located in availability zone 335C, stores copies of three different files, 350A, 350B, and 350C. In this example, each of files 350A, 350B, and 350C have a copy stored in each of the three different availability zones 335A, 335B, and 335C to provide data redundancy in case of failures (either in nodes or in an entire availability zone).

In some embodiments, after detecting that node 320BB has failed, distributed storage system 130A sends a command to availability zone 335B to repair node 350BB. In such situations, if node 320BB is repairable, then availability zone 335B repairs the node such that file 350B is accessible via node 320BB. For example, if node 322BB is experiencing intermittent failures, then availability zone 335B repairs this node to mitigate the intermittent failures. In other embodiments, distributed storage system 130A sends a command to availability zone 335B to decommission (delete and no longer store data on) the failed node 320BB and to generate a new node to replace the failed node 320BB. For example, if node 322BB is experiencing communication problems, having difficulty being discovered, having difficulty writing data, etc., then distributed storage system 130A determines to decommission the node. In such situations, the system redistributes the files previously stored on the failed node in other (existing or new) nodes of the distributed storage system 130. For example, from an SLA standpoint, the disclosed database system 100 is often required to store multiple (e.g., three as shown in FIG. 3) copies of each file on three different nodes of distributed storage system 130, which in turn are often located in different availability zones 335A-335N.

In the bottom portion of FIG. 3, the distributed storage system 130B is shown with a new node 320BC that has been generated by distributed storage system 130B for availability zone 335B to replace failed node 350BB. As shown in FIG. 3, the updated version of distributed storage system 130B includes a new node 320BC which stores a new copy of file 350B. After updating distributed storage system 130B to include a new node 320BC storing new file 350B (which is a copy of the file 350B previously stored on failed node 320BB as shown in distributed storage system 130A), the database system 100 (shown in FIG. 1) updates the metadata for new node 320BC. For example, the disclosed database system 100 updates both metadata store 140 and the reversemap 160 stored on durable storage 150. This update causes metadata store 140 and reversemap 160 to show that distributed storage system 130B includes a new node that stores a single file, new file 350B and no longer includes node 320BB (i.e., metadata for this node no longer exists in metadata store 140 or reversemap 160).

Figure 4:
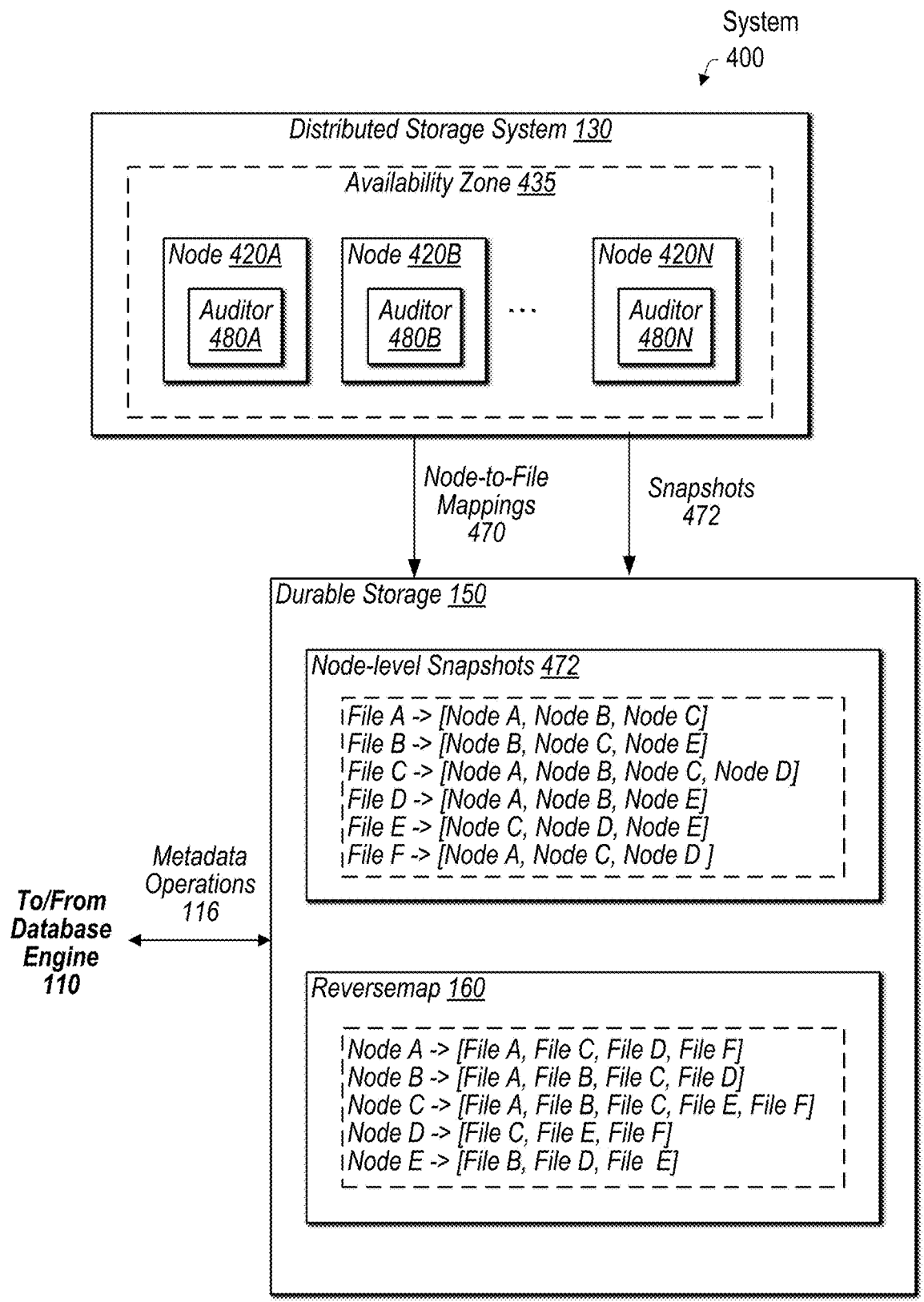
FIG. 4 is a block diagram illustrating example elements of a reversemap and node-level snapshots stored in durable storage, according to some embodiments.

Turning now to FIG. 4, a block diagram illustrating example elements of a reversemap and node-level snapshots stored in durable storage is shown. In the illustrated embodiment, system 400 (one example of database system 100) includes distributed storage system 130, which in turn includes availability zone 435, and durable storage 150, which includes node-level snapshots 472 and a reversemap 160.

Distributed storage system 130, in the illustrated embodiment, includes an availability zone 435 with a plurality of different storage nodes 420A-420N, each of which include a respective auditor service 480A-480N. In various embodiments, distributed storage system 130 may include a plurality of availability zones as discussed above in detail with reference to FIGS. 2 and 3. These auditor services 480A-480N are individual instances of a server within distributed storage system 130 run on different nodes of the system 130 that capture the metadata for that node and store it, in the form of the reversemap, on durable storage 150. For example, the different auditor services 480A-480N capture the metadata for their respective nodes 420A-420N and this captured metadata is ensembled within durable storage 150 to generate reversemap 160. Because each node 420A-420N of distributed storage system 130 runs its own auditor service 480A-480N, when one auditor service fails, it does not impact the ability of the other auditor services to capture metadata for their respective nodes for the reversemap 160.

In various embodiments, the auditor services 480A-480N execute simultaneously according to a given time interval to capture metadata to update reversemap 160. For example, the auditor services 480A-480N execute every minute, several minutes, hour, etc. to generate or update reversemap 160. While reversemap 160 may become stale such that the metadata is not the most up-to-date information due to its being generated e.g., every 15 minutes, the metadata included in metadata store 140 for distributed storage system 130 is always up to date. By providing potentially stale metadata via reversemap 160, the disclosed database system is able to increase scalability and improve latency of metadata store 140 for latency dependent operations. After capturing metadata for nodes 420A-240N, the auditor services 480A-480N transmit node-to-file mappings 470 to durable storage 150 where these mappings make up reversemap 160.

In some embodiments, distributed storage system 130 selects an "elected auditor" which includes picking a single one of the auditor services 480A-480N that will capture the metadata for nodes 420A-420N that makes up reversemap 160. For example, instead of each auditor service 480A-

480N executing simultaneously to capture the metadata for their respective nodes 420A-420N, a single "elected" auditor service executes to capture metadata for all of the nodes 420A-420N. In various embodiments, auditor services 480A-480N are operated separately from their respective nodes 420A-420N so that, if an auditor service fails, then this failure will not impact the operation of its corresponding node. If the auditor service 480 that fails is the elected auditor service at the time, then distributed storage system 130 simply elects a different auditor service as the newly elected auditor service that will capture the metadata for nodes 420A-420N to generate or update the reversemap 160 going forward.

In the illustrated embodiment, durable storage 150 includes both node-level snapshots 472 and reversemap 160. The reversemap 160, in the illustrated embodiment, includes a list of several nodes, A through C, indicating the filename of the files stored on each of the nodes A through C. For example, node A stores a copy of files A, C, D, and F. In contrast, node B stores a copy of files A, B, C, and D. Note that, according to the reversemap 160 shown in FIG. 4, three copies of each file are stored in distributed storage system 130. For example, a copy of file A is stored on nodes A, B, and C, while a copy of file B is stored on nodes B, C, and E.

In addition to generating node-to-file mappings 470 for reversemap 160, the auditor services 480A-480N (or the elected auditor service) generate node-level snapshots 472 of the nodes within distributed storage system 130. For example, auditor 480A captures a snapshot of the metadata of node 420A, which indicates that file A is stored on nodes A, B, and C (as shown in snapshots 472 stored on durable storage 150). In this example, metadata store 140 stores a map indicating a list of filenames and the nodes on which they are currently stored. The auditor services 480A-480N capture a snapshot of this information and store it in durable storage 150. Storage node-level snapshots provide an optimization, for the disclosed database system 100, that generates snapshots of data stored in different nodes of distributed storage system 130 more frequently than the reversemap is generated or updated. For example, because reversemap generation is slow and involves a large amount of data, it is often performed e.g., every 15 minutes. In contrast, capturing snapshots of each node is performed more often, e.g., every few seconds or minutes. While updating the reversemap involves re-generating the entire reversemap 160, snapshots 472 are generated by distributed storage system 130 on a per-node basis. As such, snapshot generation involves a smaller amount of data than reversemap 160 generation.

In various embodiments, as distributed storage system 130 creates files, it stores them in the individual nodes 420A-420N and replicates them across multiple different nodes. When a node, such as node 420A is lost, system 400 replicates the data stored on that node 420A within the same availability zone 435 (e.g., data center), but on a different node (e.g., node 420B). In this scenario where a single node is lost, up-to-date metadata needed to replicate the data for this node would need to be available more often than e.g., every 15 minutes. Accordingly, in addition to storing reversemap 160 on durable storage 150, distributed storage system 130 stores node-level snapshots 472 more often than the reversemap (providing more up-to-date metadata than the reversemap). In these situations, instead of consulting reversemap 160, distributed storage system 130 consults snapshots 472 for the failed nodes (e.g., failed node 420A) that was generated more recently than the reversemap 160.

After consulting the snapshot for a failed node 420A, distributed storage system 130 can replicate the data that was previously stored on the failed node 420A and store it on a different node (one of nodes 420B-420N) within the same availability zone 435. For example, nodes 420A-420N generate respective snapshots 472 of the data that respectively store at a fixed, configurable cadence (e.g., every two minutes) and persist the snapshots 472 in durable storage 150. In various embodiments, the node-level snapshots 472 are stored in different locations within durable storage 150 than reversemap 160.

Exemplary Method

Turning now to FIG. 5, a flow diagram of a method 500 is shown. Method 500 is one embodiment of a method performed by a computer system, such as system 100 discussed in detail above with reference to FIG. 1. Method 500 may be performed by executing a set of program instructions stored on a non-transitory computer-readable medium. Method 500 may be performed in response to receiving requests from one or more applications of the database system, as discussed above with reference to FIG. 1.

Method 500 begins in step 510 with the computer system receiving a request to access a set of data stored in one or more nodes of a distributed storage system that is a caching layer of the computer system. In some embodiments, the request includes a read request to read the set of data from the distributed storage system. In other embodiments, the request includes a write request to write the set of data to the distributed storage system. In some embodiments, prior to receiving the request to access the set of data, the computer system generates the reversemap. In some embodiments, generating the reversemap includes determining, for respective nodes of the distributed storage system, one or more files stored on the respective nodes. In some embodiments, generating the reversemap includes generating a map indicating, for each file stored in the distributed storage system, a list of nodes on which respective files are stored.

In step 520, the computer system retrieves metadata for the set of data specified in the request, where retrieving the metadata includes accessing a reversemap storing a reverse-ordered copy of original metadata stored in a metadata store of the computer system, and where the reversemap is stored on durable storage of the computer system. In some embodiments, the reversemap stores metadata for one or more ledgers of data stored in the distributed storage system, where the metadata stored in the reversemap indicates, for respective nodes of the distributed storage system, one or more database ledgers with a copy stored on that node. In some embodiments, retrieving the metadata for the set of data includes performing a reverse lookup of the set of data using the reversemap by determining which nodes of the distributed storage system store copies of one or more database ledgers corresponding to the set of data. In some embodiments, the durable storage that stores the reversemap is highly scalable, eventually consistent storage for servicing requested database operations.

In some embodiments, the computer system generates node-level snapshots of nodes of the distributed storage system. In some embodiments, the computer system stores the node-level snapshots in the durable storage of the computer system. In some embodiments, a size of the reversemap is larger than a size of the node-level snapshots, where the computer system generates the node-level snapshots more frequently than updated versions of the reversemap. In some embodiments, a first node-level snapshot stores a list of nodes on which a first database ledger is stored, where generating the first node-level snapshot includes executing, by a first node of the distributed storage system, an auditor service of the first node.

In step 530, the computer system accesses, based on retrieving the metadata for the set of data from the reversemap, one or more nodes of the distributed storage system for the request, where the accessing is performed based on the reversemap specifying the one or more nodes of the distributed storage system that store the set of data. In some embodiments, accessing the one or more nodes of the distributed storage system for the request includes detecting that a node of the distributed storage system has failed. In some embodiments, in response to the detecting, determining, based on the reversemap, one or more files that were previously stored in the failed node.

In some embodiments, accessing the one or more nodes of the distributed storage system for the request includes generating a new node in the distributed storage system and storing the one or more files that were previously stored in the failed node in the new node of the distributed storage system. In some embodiments, accessing the one or more nodes of the distributed storage system for the request includes decommissioning the failed node after storing the one or more files on the new node. In some embodiments, determining one or more files that were previously stored in the failed node includes identifying, based on the reversemap that at least two other nodes, in the distributed storage system, store copies of the one or more files that were stored in the failed node.

In step 540, the computer system transmits, to the computing device, information indicating a result of accessing the one or more nodes of the distributed storage system based on the metadata specified in the reversemap. In some embodiments, the information further indicates whether the request to access the set of data was successful. In some embodiments, the information includes a set of data retrieved from the distributed storage system for the request. In some embodiments, the information indicates an amount of time it took to access the one or more nodes of the distributed storage system.

In some embodiments, the computer system receives a request to read data stored in one or more nodes of the distributed storage system. In some embodiments, the computer system accesses, in response to the request to read data, the metadata store of the computer system. In some embodiments, the computer system identifies, based on the accessing, metadata indicating one or more nodes storing one or more files specified in the request to read data, where the information indicating the result includes the one or more files retrieved from the one or more nodes of the distributed storage system based on the metadata stored in the metadata store.

In some embodiments, the computer system detects that a node of the distributed storage system has failed. In some embodiments, in response to the detecting, the computer system determines, using the reversemap, one or more ledgers that were previously stored in the failed node. In some embodiments, the computer system generates a new node in the distributed storage system. In some embodiments, the computer system stores the one or more ledgers, that were previously stored in the failed node, in the new node of the distributed storage system.

Exemplary Multi-Tenant Database System

Figure 6:
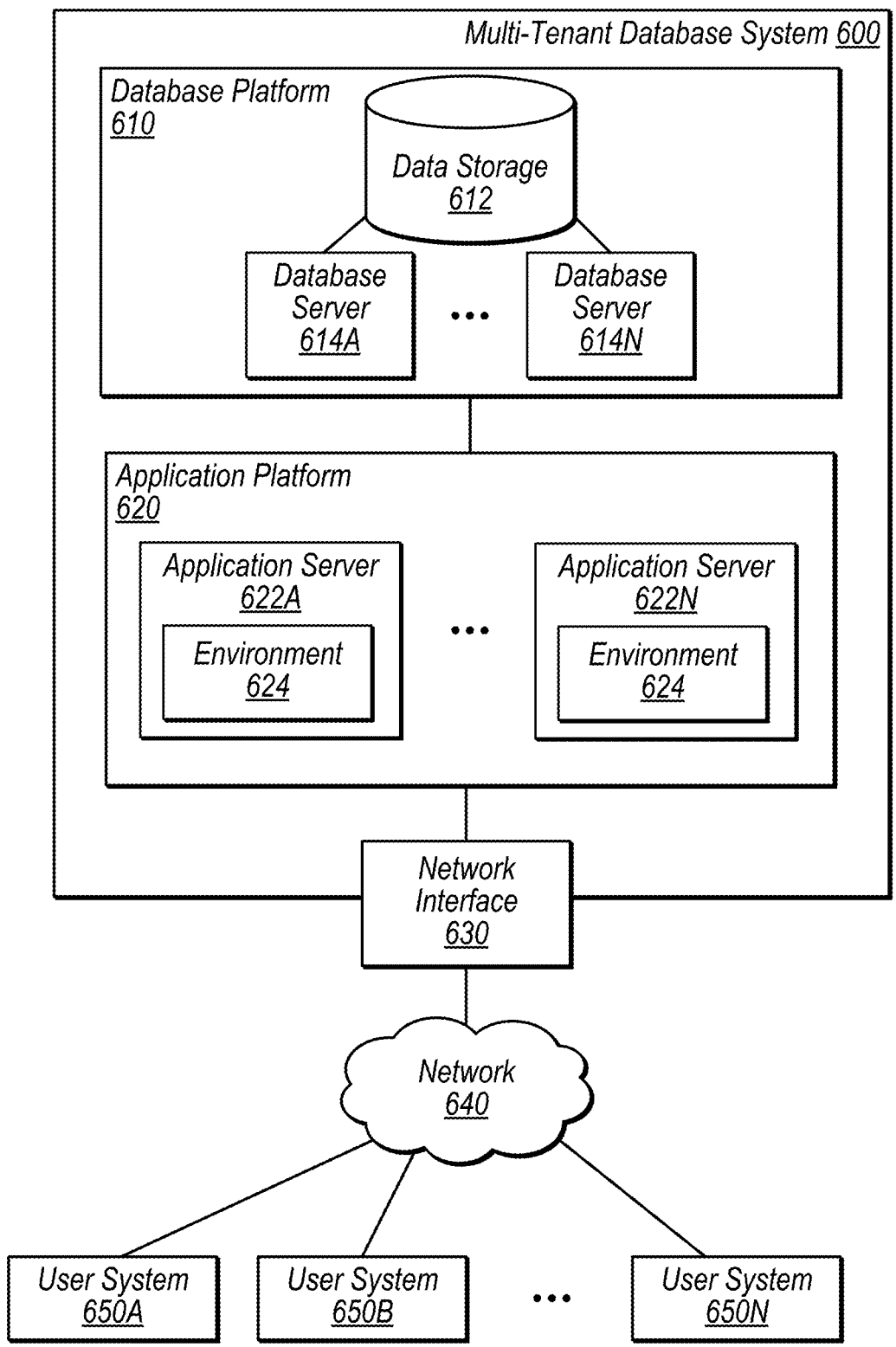
FIG. 6 is a block diagram illustrating elements of a multi-tenant system, according to some embodiments.

Turning now to FIG. 6, an exemplary multi-tenant database system (MTS) 600 in which various techniques of the present disclosure can be implemented is shown—e.g., system 100 may be MTS 600. In FIG. 6, MTS 600 includes a database platform 610, an application platform 620, and a network interface 630 connected to a network 640. Also as shown, database platform 610 includes a data storage 612 and a set of database servers 614A-N that interact with data storage 612, and application platform 620 includes a set of application servers 622A-N having respective environments 624. In the illustrated embodiment, MTS 600 is connected to various user systems 650A-650N through network 640. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 600, in various embodiments, is a set of computer systems that together provide various services to users (alternatively referred to as "tenants") that interact with MTS 600. In some embodiments, MTS 600 implements a customer relationship management (CRM) system that provides mechanism for tenants (e.g., companies, government bodies, etc.) to manage their relationships and interactions with customers and potential customers. For example, MTS 600 might enable tenants to store customer contact information (e.g., a customer's website, email address, telephone number, and social media data), identify opportunities, record service issues, and manage marketing campaigns. MTS 600 may also enable those tenants to identify how customers have been communicated with, what the customers have bought, when the customers last purchased items, and what the customers paid. To provide the services of a CRM system and/or other services, as shown, MTS 600 includes a database platform 610 and an application platform 620.

Database platform 610, in various embodiments, is a combination of hardware elements and software routines that implement database services for storing and managing data of MTS 600, including tenant data. As shown, database platform 610 includes data storage 612. Data storage 612, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 612 is used to implement a database (e.g., distributed storage system 130, durable storage 150, metadata store 140) comprising a collection of information that is organized in a way that allows for access, storage, and manipulation of the information. Data storage 612 may implement a single database, a distributed database, a collection of distributed databases, a database with redundant online or offline backups or other redundancies, etc. As part of implementing the database, data storage 612 may store files (e.g., files or database extents stored in nodes 120) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 600 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 612 is organized as part of a log-structured merge-tree (LSM tree). An LSM tree normally includes two high-level components: an in-memory buffer and a persistent storage. In operation, a database server 614 may initially write database records into a local in-memory buffer before later flushing those records to the persistent storage (e.g., data storage 612). As part of flushing database records, the database server 614 may write the database records into new files that are included in a "top" level of the LSM tree. Over time, the database records may be rewritten by database servers 614 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 612.

When a database server 614 wishes to access a database record for a particular key, the database server 614 may traverse the different levels of the LSM tree for files that potentially include a database record for that particular key. If the database server 614 determines that a file may include a relevant database record, the database server 614 may fetch the file from data storage 612 into a memory of the database server 614. The database server 614 may then check the fetched file for a database record having the particular key. In various embodiments, database records are immutable once written to data storage 612. Accordingly, if the database server 614 wishes to modify the value of a row of a table (which may be identified from the accessed database record), the database server 614 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 614, in various embodiments, are hardware elements, software routines, or a combination thereof capable of providing database services, such as data storage, data retrieval, and/or data manipulation. A database engine 110 may be a database server that may correspond to distributed storage system 130 or one or more nodes 120 of system 130. Such database services may be provided by database servers 614 to components (e.g., application servers 622) within MTS 600 and to components external to MTS 600. As an example, a database server 614 may receive a database transaction request from an application server 622 that is requesting data to be written to or read from data storage 612. The database transaction request may specify an SQL SELECT command to select one or more rows from one or more database tables. The contents of a row may be defined in a database record and thus database server 614 may locate and return one or more database records that correspond to the selected one or more table rows. In various cases, the database transaction request may instruct database server 614 to write one or more database records for the LSM tree-database servers 614 maintain the LSM tree implemented on database platform 610. In some embodiments, database servers 614 implement a relational database management system (RDMS) or object oriented database management system (OODBMS) that facilitates storage and retrieval of information against data storage 612. In various cases, database servers 614 may communicate with each other to facilitate the processing of transactions. For example, database server 614A may communicate with database server 614N to determine if database server 614N has written a database record into its in-memory buffer for a particular key.

Application platform 620, in various embodiments, is a combination of hardware elements and software routines that implement and execute CRM software applications as well as provide related data, code, forms, web pages and other information to and from user systems 650 and store related data, objects, web page content, and other tenant information via database platform 610. In order to facilitate these services, in various embodiments, application platform 620 communicates with database platform 610 to store, access, and manipulate data. In some instances, application platform 620 may communicate with database platform 610 via different network connections. For example, one application server 622 may be coupled via a local area network and another application server 622 may be coupled via a direct network link. Transfer Control Protocol and Internet Protocol (TCP/IP) are exemplary protocols for communicating between application platform 620 and database platform 610, however, it will be apparent to those skilled in the art that other transport protocols may be used depending on the network interconnect used.

Application servers 622, in various embodiments, are hardware elements, software routines, or a combination thereof capable of providing services of application platform 620, including processing requests received from tenants of MTS 600. Application servers 622, in various embodiments, can spawn environments 624 that are usable for various purposes, such as providing functionality for developers to develop, execute, and manage applications (e.g., business logic). Data may be transferred into an environment 624 from another environment 624 and/or from database platform 610. In some cases, environments 624 cannot access data from other environments 624 unless such data is expressly shared. In some embodiments, multiple environments 624 can be associated with a single tenant.

Application platform 620 may provide user systems 650 access to multiple, different hosted (standard and/or custom) applications, including a CRM application and/or applications developed by tenants. In various embodiments, application platform 620 may manage creation of the applications, testing of the applications, storage of the applications into database objects at data storage 612, execution of the applications in an environment 624 (e.g., a virtual machine of a process space), or any combination thereof. In some embodiments, application platform 620 may add and remove application servers 622 from a server pool at any time for any reason, there may be no server affinity for a user and/or organization to a specific application server 622. In some embodiments, an interface system (not shown) implementing a load balancing function (e.g., an F5 Big-IP load balancer) is located between the application servers 622 and the user systems 650 and is configured to distribute requests to the application servers 622. In some embodiments, the load balancer uses a least connections algorithm to route user requests to the application servers 622. Other examples of load balancing algorithms, such as are round robin and observed response time, also can be used. For example, in certain embodiments, three consecutive requests from the same user could hit three different servers 622, and three requests from different users could hit the same server 622.

In some embodiments, MTS 600 provides security mechanisms, such as encryption, to keep each tenant's data separate unless the data is shared. If more than one server 614 or 622 is used, they may be located in close proximity to one another (e.g., in a server farm located in a single building or campus), or they may be distributed at locations remote from one another (e.g., one or more servers 614 located in city A and one or more servers 622 located in city B). Accordingly, MTS 600 may include one or more logically and/or physically connected servers distributed locally or across one or more geographic locations.

One or more users (e.g., via user systems 650) may interact with MTS 600 via network 640. User system 650 may correspond to, for example, a tenant of MTS 600, a provider (e.g., an administrator) of MTS 600, or a third party. Each user system 650 may be a desktop personal computer, workstation, laptop, PDA, cell phone, or any Wireless Access Protocol (WAP) enabled device or any other computing device capable of interfacing directly or indirectly to the Internet or other network connection. User system 650 may include dedicated hardware configured to interface with MTS 600 over network 640. User system 650 may execute a graphical user interface (GUI) corresponding to MTS 600, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 650 to access, process, and view information and pages available to it from MTS 600 over network 640. Each user system 650 may include one or more user interface devices, such as a keyboard, a mouse, touch screen, pen or the like, for interacting with a graphical user interface (GUI) provided by the browser on a display monitor screen, LCD display, etc. in conjunction with pages, forms or other information provided by MTS 600 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 650 may be users in differing capacities, the capacity of a particular user system 650 might be determined one or more permission levels associated with the current user. For example, when a user is using a particular user system 650 to interact with MTS 600, that user system 650 may have capacities (e.g., user privileges) allotted to that user. But when an administrator is using the same user system 650 to interact with MTS 600, the user system 650 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 600 that are allocated at the tenant level while other data structures are managed at the user level.

In some embodiments, a user system 650 and its components are configurable using applications, such as a browser, that include computer code executable on one or more processing elements. Similarly, in some embodiments, MTS 600 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 640 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 650 may communicate with MTS 600 using TCP/IP and, at a higher network level, use other common Internet protocols to communicate, such as HTTP, FTP, AFS, WAP, etc. For example, where HTTP is used, user system 650 might include an HTTP client commonly referred to as a "browser" for sending and receiving HTTP messages from an HTTP server at MTS 600. Such a server might be implemented as the sole network interface between MTS 600 and network 640, but other techniques might be used as well or instead. In some implementations, the interface between MTS 600 and network 640 includes load sharing functionality, such as round-robin HTTP request distributors to balance loads and distribute incoming HTTP requests evenly over a plurality of servers.

In various embodiments, user systems 650 communicate with application servers 622 to request and update system-level and tenant-level data from MTS 600 that may require one or more queries to data storage 612. In some embodiments, MTS 600 automatically generates one or more SQL statements (the SQL query) designed to access the desired information. In some cases, user systems 650 may generate requests having a specific format corresponding to at least a portion of MTS 600. As an example, user systems 650 may request to move data objects into a particular environment 624 using an object notation that describes an object relationship mapping (e.g., a JavaScript object notation mapping) of the specified plurality of objects.

Exemplary Computer System

Figure 7:
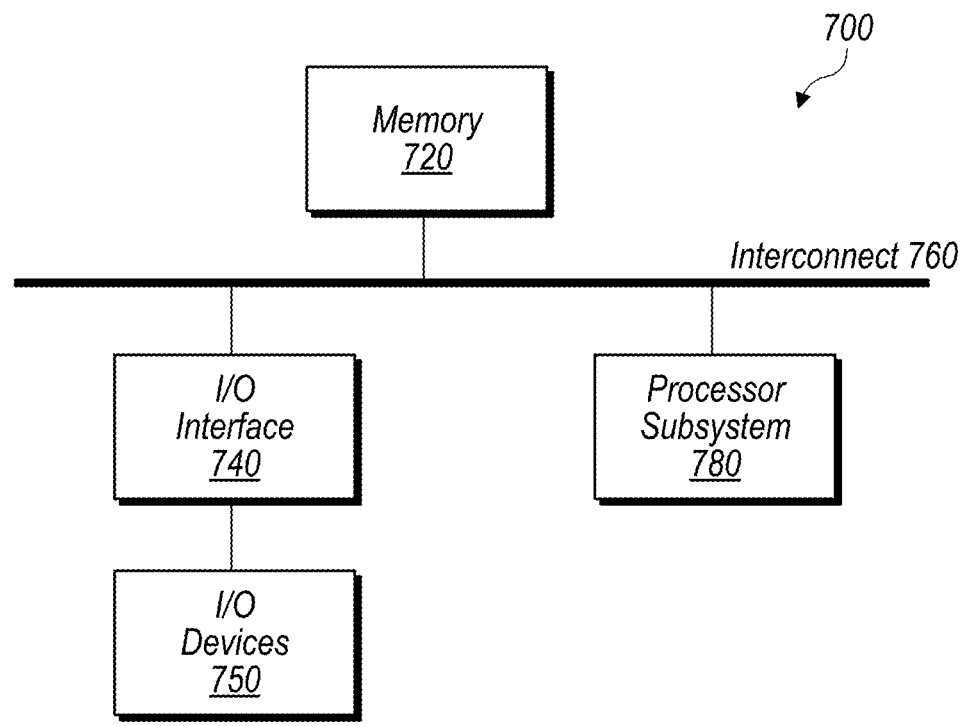
FIG. 7 is a block diagram illustrating elements of a computer system configured to implement various systems described in the present disclosure, according to some embodiments.

Turning now to FIG. 7, a block diagram of an exemplary computer system 700, which may implement database system 100, database engine 110, distributed storage system 130, and durable storage 150, MTS 600, and/or user system 650, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement database engine 110 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over Wi-Fi, Bluetooth, Ethernet, etc.).

A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

One common component of a cloud computing system is a data center. As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. In many cases, they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   receiving, by a computer system from a computing device, a request to access a set of data stored in one or more nodes of a distributed storage system that is a caching layer of the computer system;
   retrieving, by the computer system, metadata for the set of data specified in the request, wherein retrieving the metadata includes accessing a reversemap storing a reverse-ordered copy of original metadata stored in a metadata store of the computer system, and wherein the reversemap is stored on durable storage of the computer system;
   accessing, by the computer system based on retrieving the metadata for the set of data from the reversemap, one or more nodes of the distributed storage system for the request, wherein the accessing is performed based on the reversemap specifying the one or more nodes of the distributed storage system that store the set of data; and
   transmitting, by the computer system to the computing device, information indicating a result of accessing the one or more nodes of the distributed storage system based on the metadata specified in the reversemap.

2. The method of claim 1, wherein the reversemap stores metadata for one or more ledgers of data stored in the distributed storage system, wherein the metadata stored in the reversemap indicates, for respective nodes of the distributed storage system, one or more database ledgers with a copy stored on that node, and wherein retrieving the metadata for the set of data includes performing a reverse lookup of the set of data using the reversemap by determining which nodes, of the distributed storage system, store copies of one or more database ledgers corresponding to the set of data.

3. The method of claim 1, further comprising:
generating, by the computer system, node-level snapshots of nodes of the distributed storage system; and
storing, by the computer system, the node-level snapshots in the durable storage of the computer system.

4. The method of claim 3, wherein a size of the reversemap is larger than a size of the node-level snapshots, and wherein the computer system generates the node-level snapshots more frequently than updated versions of the reversemap.

5. The method of claim 1, further comprising:
receiving, by the computer system, a request to read data stored in one or more nodes of the distributed storage system;
accessing, by the computer system in response to the request to read data, the metadata store of the computer system; and
identifying, by the computer system based on the accessing, metadata indicating one or more nodes storing one or more files specified in the request to read data, wherein the information indicating the result includes the one or more files retrieved from the one or more nodes of the distributed storage system based on the metadata stored in the metadata store.

6. The method of claim 1, wherein accessing the one or more nodes of the distributed storage system for the request includes:
detecting that a node of the distributed storage system has failed;
in response to the detecting, determining, based on the reversemap, one or more files that were previously stored in the failed node;
generating a new node in the distributed storage system;
storing the one or more files that were previously stored in the failed node in the new node of the distributed storage system; and
after storing the one or more files on the new node, decommissioning the failed node.

7. The method of claim 6, wherein the determining includes:
identifying, based on the reversemap that at least two other nodes, in the distributed storage system, store copies of the one or more files that were stored in the failed node.

8. The method of claim 1, wherein the durable storage that stores the reversemap is a highly-scalable, eventually consistent storage for servicing requested database operations.

9. A non-transitory computer-readable medium having instructions stored thereon that are capable of causing a computing system to implement operations comprising:
receiving, from a computing device, a request to access a set of data stored in one or more nodes of a distributed storage system that is a caching layer of the computing system;
retrieving metadata for the set of data specified in the request, wherein retrieving the metadata includes accessing a reversemap storing a reverse-ordered copy of original metadata stored in a metadata store of the computing system, and wherein the reversemap is stored on durable storage of the computing system;
accessing, based on retrieving the metadata for the set of data from the reversemap, one or more nodes of the distributed storage system for the request, wherein the accessing is performed based on the reversemap specifying the one or more nodes of the distributed storage system that store the set of data; and
transmitting, to the computing device, information indicating a result of accessing the one or more nodes of the distributed storage system based on the metadata specified in the reversemap.

10. The non-transitory computer-readable medium of claim 9, wherein the operations further comprise:
generating, prior to receiving the request to access the set of data, the reversemap, wherein generating the reversemap includes:
determining, for respective nodes of the distributed storage system, one or more files stored on the respective nodes; and
generating a map indicating, for each file stored in the distributed storage system, a list of nodes on which respective files are stored.

11. The non-transitory computer-readable medium of claim 9, wherein the reversemap stores metadata for one or more ledgers of data stored in the distributed storage system, wherein the reversemap indicates, for respective nodes of the distributed storage system, one or more ledgers of data with a copy stored on that node, and wherein retrieving the metadata for the set of data includes performing a reverse lookup of the set of data by determining which nodes of the distributed storage system store copies of which ledgers.

12. The non-transitory computer-readable medium of claim 9, wherein the operations further comprise:
generating node-level snapshots of nodes of the distributed storage system, wherein a given node-level snapshot indicates, for a given file stored by the distributed storage system, one or more nodes that store a copy of the given file; and
storing the node-level snapshots in the durable storage of the computing system.

13. The non-transitory computer-readable medium of claim 12, wherein the computing system generates the node-level snapshots more frequently than updated versions of the reversemap, and wherein the information further indicates whether the request to access the set of data was successful.

14. The non-transitory computer-readable medium of claim 12, wherein a first node-level snapshot stores a list of nodes on which a first database ledger is stored, and wherein generating the first node-level snapshot includes executing, by a first node of the distributed storage system, an auditor service of the first node.

15. The non-transitory computer-readable medium of claim 9, wherein the operations further comprise:
detecting that a node of the distributed storage system has failed;
in response to the detecting, determining, using the reversemap, one or more ledgers that were previously stored in the failed node;
generating a new node in the distributed storage system; and
storing the one or more ledgers, that were previously stored in the failed node, in the new node of the distributed storage system.

16. A system, comprising:
at least one processor; and a memory having instructions stored thereon that are executable by the at least one processor to cause the system to:
- receive, from a computing device, a request to access a set of data stored in one or more nodes of a distributed storage system that is a caching layer of the system;
- retrieve metadata for the set of data specified in the request, wherein retrieving the metadata includes accessing a reversemap storing a reverse-ordered copy of original metadata stored in a metadata store of the system, and wherein the reversemap is stored on durable storage of the system;
- access, based on retrieving the metadata for the set of data from the reversemap, one or more nodes of the distributed storage system for the request, wherein the accessing is performed based on the reversemap specifying the one or more nodes of the distributed storage system that store the set of data; and
- transmit, to the computing device, information indicating a result of accessing the one or more nodes of the distributed storage system based on the metadata specified in the reversemap.

17. The system of claim 16, wherein the reversemap stores metadata for one or more files of data stored in the distributed storage system, wherein the metadata stored in the reversemap indicates, for respective nodes of the distributed storage system, one or more ledgers with a copy stored on that node, and wherein retrieving the metadata for the set of data includes performing a reverse lookup of the set of data using the reversemap by determining which nodes of the distributed storage system store copies of one or more files storing the set of data.

18. The system of claim 16, wherein the instructions are further executable by the at least one processor to cause the system to:
- generate node-level snapshots of nodes of the distributed storage system; and
- store the node-level snapshots in the durable storage of the system.

19. The system of claim 18, wherein a size of the reversemap is larger than a size of the node-level snapshots, wherein the system generates the node-level snapshots more frequently than the reversemap, wherein a first node-level snapshot stores a list of nodes on which a first file is stored, and wherein generating the first node-level snapshot includes executing, by a first node of the distributed storage system, an auditor service of the first node.

20. The system of claim 16, wherein the instructions are further executable by the at least one processor to cause the system to:
- detect that a node of the distributed storage system has failed;
- in response to the detecting, determine, using the reversemap, one or more files that were stored in the failed node;
- generate a new node in the distributed storage system; and
- store the one or more files, that were previously stored in the failed node, in the new node of the distributed storage system.

* * * * *